United States Patent
Buvaev et al.

(10) Patent No.: US 11,316,893 B2
(45) Date of Patent: Apr. 26, 2022

(54) METHOD AND SYSTEM FOR IDENTIFYING MALICIOUS ACTIVITY OF PRE-DETERMINED TYPE IN LOCAL AREA NETWORK

(71) Applicant: YANDEX EUROPE AG, Lucerne (CH)

(72) Inventors: Borlyk Lidzhievich Buvaev, Ketchenery (RU); Sergey Vyacheslavovich Statyev, Moscow (RU); Aleksandr Sergeevich Dubikovsky, Zarechnyy (RU)

(73) Assignee: YANDEX EUROPE AG, Lucerne (CH)

( * ) Notice: Subject to any disclaimer, the term of this patent is extended or adjusted under 35 U.S.C. 154(b) by 183 days.

(21) Appl. No.: 16/911,503

(22) Filed: Jun. 25, 2020

(65) Prior Publication Data

US 2021/0203689 A1 Jul. 1, 2021

(30) Foreign Application Priority Data

Dec. 25, 2019 (RU) .............................. 2019143904

(51) Int. Cl.
*H04L 29/06* (2006.01)
(52) U.S. Cl.
CPC ...... *H04L 63/1466* (2013.01); *H04L 63/0236* (2013.01); *H04L 63/1425* (2013.01)
(58) Field of Classification Search
CPC ............. H04L 63/1466; H04L 63/0236; H04L 63/1425
See application file for complete search history.

(56) References Cited

U.S. PATENT DOCUMENTS 5,467,006 A * 11/1995 Sims ................... B60H 1/2218
320/155
7,519,562 B1 4/2009 Vander et al.
(Continued)

FOREIGN PATENT DOCUMENTS

CN 103853744 A 6/2014
RU 2378692 C2 1/2010
(Continued)

OTHER PUBLICATIONS

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.
(Continued)

*Primary Examiner* — Vance M Little
(74) *Attorney, Agent, or Firm* — BCF LLP

(57) ABSTRACT

There is disclosed a method for identifying malicious activity, the method being executable by a supervisory electronic device. The method comprises accessing, a log to retrieve usage information associated with at least a portion of the plurality of electronic devices; analyzing the usage information to identify a subset of electronic devices; analyzing a list of network resources accessed; executing, by the supervisory electronic device a polling robot, the polling robot configured to: transmit to each of the list of network resources a ping message, the ping message having a first pre-determined format having been generated based on the malicious activity; analyzing, the response message; responsive to the response message having a second pre-determined format, the second pre-determined format having been identified based on the pre-determined type of malicious activity; determining that an associated network
(Continued)

resource having generated the response message is associated with malicious activity.

20 Claims, 5 Drawing Sheets

(56) References Cited

U.S. PATENT DOCUMENTS

| | | | |
|---|---|---|---|
| 7,610,276 | B2 | 10/2009 | Yomtobian |
| 7,827,054 | B2 | 11/2010 | Campbell et al. |
| 7,877,800 | B1 | 1/2011 | Satish et al. |
| 8,578,462 | B2 | 11/2013 | Petrovic |
| 8,661,299 | B1 | 2/2014 | Ip |
| 8,966,631 | B2 | 2/2015 | El-Moussa et al. |
| 9,047,628 | B2 | 6/2015 | Mislove et al. |
| 9,092,510 | B1 | 7/2015 | Stets et al. |
| 9,098,459 | B2 | 8/2015 | Davis et al. |
| 9,183,387 | B1 | 11/2015 | Altman et al. |
| 9,241,010 | B1 | 1/2016 | Bennett et al. |
| 9,349,134 | B1 | 5/2016 | Adams et al. |
| 9,479,516 | B2 | 10/2016 | Mote et al. |
| 9,652,354 | B2 | 5/2017 | Filimonov et al. |
| 9,672,242 | B2 | 6/2017 | Jung et al. |
| 9,846,896 | B2 | 12/2017 | Shah et al. |
| 9,866,566 | B2 | 1/2018 | Dulkin et al. |
| 9,870,596 | B2 | 1/2018 | Babinowich et al. |
| 10,009,358 | B1 | 6/2018 | Xie et al. |
| 10,084,816 | B2 | 9/2018 | Zhang et al. |
| 10,089,660 | B2 | 10/2018 | Luan et al. |
| 10,218,733 | B1 | 2/2019 | Amidon et al. |
| 10,348,767 | B1 * | 7/2019 | Lee .................. H04L 63/1433 |
| 10,362,057 | B1 * | 7/2019 | Wu .................. H04L 63/1408 |
| 10,565,372 | B1 * | 2/2020 | Stickle .................. G06F 21/55 |
| 2004/0260922 | A1 | 12/2004 | Goodman et al. |
| 2005/0262026 | A1 | 11/2005 | Watkins et al. |
| 2008/0162475 | A1 | 7/2008 | Meggs et al. |
| 2008/0172271 | A1 | 7/2008 | Wee et al. |
| 2008/0301090 | A1 | 12/2008 | Sadagopan et al. |
| 2008/0301811 | A1 | 12/2008 | Jung |
| 2009/0049547 | A1 | 2/2009 | Fan |
| 2009/0083184 | A1 | 3/2009 | Eisen et al. |
| 2009/0249480 | A1 * | 10/2009 | Osipkov ............. H04L 63/1408 726/22 |
| 2010/0262688 | A1 * | 10/2010 | Hussain ............. H04L 63/1433 709/224 |
| 2011/0055104 | A1 | 3/2011 | Sun et al. |
| 2011/0208714 | A1 | 8/2011 | Soukal et al. |
| 2012/0233692 | A1 | 10/2012 | Oh et al. |
| 2013/0332468 | A1 | 12/2013 | Hardas et al. |
| 2014/0114877 | A1 | 4/2014 | Montano |
| 2014/0214570 | A1 | 7/2014 | Smolev et al. |
| 2015/0205862 | A1 | 7/2015 | Campagne et al. |
| 2015/0264073 | A1 | 9/2015 | Tavakoli et al. |
| 2015/0326674 | A1 | 11/2015 | Kruglick et al. |
| 2015/0341383 | A1 | 11/2015 | Reddy et al. |
| 2016/0065600 | A1 | 3/2016 | Lee et al. |
| 2016/0196566 | A1 | 7/2016 | Murali et al. |
| 2016/0259742 | A1 | 9/2016 | Faulkner et al. |
| 2016/0294775 | A1 * | 10/2016 | Mahadik .................. H04L 63/10 |
| 2016/0321711 | A1 | 11/2016 | Wouhaybi et al. |
| 2017/0171186 | A1 * | 6/2017 | Purushothaman .... H04L 63/102 |
| 2017/0220971 | A1 | 8/2017 | Giammaria et al. |
| 2017/0221111 | A1 | 8/2017 | Salehi et al. |
| 2017/0230229 | A1 | 8/2017 | Sasturkar et al. |
| 2017/0272458 | A1 | 9/2017 | Muddu et al. |
| 2017/0288955 | A1 * | 10/2017 | Yin .................. H04L 43/0817 |
| 2018/0048658 | A1 | 2/2018 | Hittel et al. |
| 2018/0124095 | A1 * | 5/2018 | Hamdi .............. G06F 12/0868 |
| 2018/0196684 | A1 | 7/2018 | Pengfei et al. |
| 2018/0218295 | A1 | 8/2018 | Hasija et al. |
| 2018/0278647 | A1 | 9/2018 | Gabaev et al. |
| 2018/0357683 | A1 | 12/2018 | Pickover et al. |
| 2019/0034986 | A1 | 1/2019 | Robinson et al. |
| 2019/0064752 | A1 | 2/2019 | Marwah et al. |
| 2019/0379700 | A1 | 12/2019 | Canzanese et al. |
| 2020/0012981 | A1 | 1/2020 | Davison et al. |
| 2020/0311309 | A1 | 10/2020 | Dawer et al. |
| 2020/0342006 | A1 | 10/2020 | Rossi et al. |

FOREIGN PATENT DOCUMENTS

| | | | |
|---|---|---|---|
| WO | 2018222797 | A1 | 12/2018 |
| WO | 2019013771 | A1 | 1/2019 |

OTHER PUBLICATIONS

Walgampaya "Cracking the Smart ClickBot", Conference: 13th IEEE International Symposium on Web Systems Evolution, WSE 2011, Williamsburg, VA, USA, Sep. 30, 2011 DOI: 10.1109/WSE.2011.6081830, retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Russian Search Report dated Oct. 29, 2021 issued in respect of the related Russian Patent Application No. RU 2019126743.

Notice of Allowance dated Apr. 2, 2021 received in respect of a related U.S. Appl. No. 16/868,363.

Office Action dated May 13, 2021 received in respect of a related U.S. Appl. No. 16/869,878.

Notice of Allowance dated Jun. 24, 2021 received in respect of a related U.S. Appl. No. 16/869,282.

* cited by examiner

| 120 | CPU | Disk Reading | Disk Writing |
|---|---|---|---|
| time 1 | 85% | 80% | 10% |
| time 2 | 75% | 90% | 15% |
| time 3 | 90% | 95% | 5% |
| ... | ... | ... | ... |
| time N | 95% | 95% | 5% |

FIG. 3

METHOD AND SYSTEM FOR IDENTIFYING MALICIOUS ACTIVITY OF PRE-DETERMINED TYPE IN LOCAL AREA NETWORK

CROSS-REFERENCE

The present application claims priority to Russian Patent Application No. 2019143904, entitled "Method and System for Identifying Malicious Activity of Pre-Determined Type in Local Area Network," filed on Dec. 25, 2019, the entirety of which is incorporated herein by reference.

FIELD

The present technology generally relates to systems and methods for identifying malicious activity, and, in particular, to methods and systems for identifying malicious activity of a pre-determined type in a Local Area Network (LAN).

BACKGROUND

There are known cloud-based computing solutions. Some of them provide users with an ability to register to use Virtual Machines (VM) and dedicated server resources for executing various user's tasks. Some of the cloud-based computing service providers also provide an ability for the user to register for a trial account.

It is generally known that some unscrupulous users register a large number of free trial account and use the provided VMs to execute tasks that are against the terms and conditions of the trial account. For example, an unscrupulous user may use the VM for executing block chain mining (such as crypto currency mining). Naturally, this puts a strain on the resources of the cloud computing providers, from the technical perspective. From a commercial perspective, such use of the trial accounts defeats the purpose of such trial accounts, since not only these unscrupulous users will never convert into regular subscribers (i.e. paying users) to the cloud-based computing service, but also they will often register multiple trial account for the sole purpose of mining to increase their gains.

United Stated Patent Application No. 20180196684 A1 assigned to International Business Machines Corporation, published on Jul. 12, 2018, and titled "Method, system, and computer program product for application identification in a cloud platform" discloses method, system, and computer program product, including extracting information related to one or more processes of one or more applications running on a virtual machine from a memory of the virtual machine, building at least one first application signature based on the extracted information, and identifying the one or more applications running on the virtual machine by matching the at least one first application signature with one or more second application signatures previously stored.

U.S. Pat. No. 10,084,816 B2 issued to Fortinet Inc., published on Dec. 29, 2016 and entitled "Protocol based detection of suspicious network traffic" discloses identification of suspicious network traffic indicative of a Botnet and/or an Advanced Persistent Threat (APT) based on network protocol of such traffic. According to one embodiment, a traffic file is received at a network security device that is protecting a private network. The traffic file contains therein network traffic associated with the private network that has been captured and stored. The received traffic file is processed by the network security device to determine whether the network traffic relates to a network protocol that is indicative of existence of a network security threat within the private network. When existence of the network security threat is detected, then the network security device reports details regarding the network security threat.

SUMMARY

The non-limiting embodiments of the present technology have been developed based on inventors' appreciation of at least one problem associated with the prior art approaches to determining malicious activities in a cloud-based environment. As noted above, malicious block chain miners register a large number of trial accounts using fake e-mail addresses (created using free e-mail provider services, for example). Such miners can also abuse non-trial and stolen accounts of the cloud-based computing system.

Such "abusers" are not easy to catch. The cloud-based computing system provider does not have access to the users' data in the virtual machine (VM) due to privacy and other concerns. However, developers of the non-limiting embodiments of the present technology have realized that the typical cloud-based computing system provider has access to "external data"—for example, IP-addresses and access ports used by VMs to access network resources.

Developers of the present technology, although initially focused on cloud-based computing systems, have further realized that the same problems can occur in any LAN, such as a corporate LAN and the like, whereby malicious individuals can use physical electronic devices connected to such LAN for carrying out their malicious activities, such as cryptocurrency and other block chain mining (these being just examples of malicious activities of a pre-determined type that one may be desirous of identifying and, potentially, blocking or limiting).

Thus, broadly speaking, the non-limiting embodiments of the present technology are directed to malicious activities detection and, more specifically, to methods and systems for identifying malicious activities of a pre-determined type in a cloud-based computing system and other types of LANs having physical electronic devices or VMs connected thereto.

Non-limiting embodiments of the present technology are based on the premise that a supervisory electronic device can monitor external data, based on which the supervisory electronic device can determine whether the specific VM in the cloud-based computing system or the specific electronic device connected to a LAN is used for executing a malicious activity of a pre-determined type.

In accordance with a first broad aspect of the present technology, there is disclosed a computer implemented method for identifying malicious activity of a pre-determined type, the method being executable by a supervisory electronic device, the supervisory electronic device being part of a local area network (LAN), the LAN including a plurality of electronic devices configured to access network resources via the LAN and a wide area network (WAN) accessible by the LAN, the method comprising: accessing, by the supervisory electronic device, a log to retrieve usage information associated with at least a portion of the plurality of electronic devices; analyzing, by the supervisory electronic device, the usage information to identify a subset of electronic devices, the subset of electronic devices being candidates for being associated with malicious activity within the WAN; analyzing, by the supervisory electronic device, for each of the subset of electronic devices a list of network resources accessed by a respective one of the subset of electronic devices via the WAN; executing, by the supervisory electronic device a polling robot, the polling robot configured to: transmit to each of the list of network resources a ping message, the ping message having a first pre-determined format having been generated based on the pre-determined type of malicious activity; receive from at least some of the list of network resources a response message; analyzing, by the supervisory electronic device, the response message; responsive to the response message having a second pre-determined format, the second pre-determined format having been identified based on the pre-determined type of malicious activity: determining, by the supervisory electronic device, that an associated network resource having generated the response message is associated with malicious activity.

In some non-limiting embodiments of the method, in response to one of: (i) the response message not having the second pre-determined format and (ii) lack of response from a given one of the list of network resources, determining that the given one of the list of network resources is not associated with malicious activity.

In some non-limiting embodiments of the method, the pre-determined type is blockchain mining.

In some non-limiting embodiments of the method, wherein the first pre-determined format and the second pre-determined format are part of STRATUM overlay protocol.

In some non-limiting embodiments of the method, the first pre-determined format and the second pre-determined format are part of handshake messages of the STRATUM overlay protocol.

In some non-limiting embodiments of the method, the usage information is associated with operation of the portion of the plurality of electronic devices.

In some non-limiting embodiments of the method, the usage information comprises at least one of: CPU usage; disk usage for writing; and disk usage for reading.

In some non-limiting embodiments of the method, the analyzing the usage information comprises applying at least one heuristic to the usage information.

In some non-limiting embodiments of the method, the at least one heuristic comprises: determining an average CPU usage to be above a first threshold; determining a coefficient of variation of the CPU usage to be below a second threshold; determining the disk usage for reading to be above a third threshold; and determining the disk usage for writing to be below a fourth threshold.

In some non-limiting embodiments of the method, the usage information comprises a list of network addresses used by the portion of the plurality of electronic devices to access network resources via the WAN.

In some non-limiting embodiments of the method, the analyzing the usage information comprises applying at least one heuristic to the usage information.

In some non-limiting embodiments of the method, the at least one heuristic comprises determining if access to the network resource has been using a pre-determined port associated with the pre-determined type of malicious activity.

In some non-limiting embodiments of the method, the at least one heuristic comprises: determining if access to the network resource has been done using one of a TCP port 3333, TCP port 5555, TCP port 7777, TCP port 8080, TCP port 14433, TCP port 14444, TCP port 37781, TCP port 45700, TCP port 45560 and TCP port 6667.

In some non-limiting embodiments of the method, LAN comprises a cloud-based computing environment, and wherein the plurality of electronic devices comprises a plurality of Virtual Machines (VM) executed in the cloud-based computing environment.

In some non-limiting embodiments of the method, the plurality of computing devices comprises a plurality of physical electronic devices connectable to the LAN for accessing the WAN.

In some non-limiting embodiments of the method, comprising executing a remedial action in association with the associated network resource that has been determined to be associated with malicious activity.

In some non-limiting embodiments of the method, the remedial action comprises blocking traffic to the associated network resources from the LAN.

In some non-limiting embodiments of the method, the remedial action comprises blocking all network access to the WAN for a given electronic device that has accessed the network resource.

In accordance with another broad aspect of the present technology, there is disclosed a supervisory electronic device for identifying malicious activity of a pre-determined type, the supervisory electronic device being part of a local area network (LAN), the LAN including a plurality of electronic devices configured to access network resources via the LAN and a wide area network (WAN) accessible by the LAN, the supervisory electronic device comprising a processor being configured to: access a log to retrieve usage information associated with at least a portion of the plurality of electronic devices; analyze the usage information to identify a subset of electronic devices, the subset of electronic devices being candidates for being associated with malicious activity within the WAN; analyze for each of the subset of electronic devices a list of network resources accessed by a respective one of the subset of electronic devices via the WAN; execute a polling robot, the polling robot configured to: transmit to each of the list of network resources a ping message, the ping message having a first pre-determined format having been generated based on the pre-determined type of malicious activity; receive from at least some of the list of network resources a response message; analyze the response message; responsive to the response message having a second pre-determined format, the second pre-determined format having been identified based on the pre-determined type of malicious activity: determine that an associated network resource having generated the response message is associated with malicious activity.

In some non-limiting embodiments of the device, in response to one of: (i) the response message not having the second pre-determined format and (ii) lack of response from a given one of the list of network resources, the processor is configured to determine that the given one of the list of network resources is not associated with malicious activity.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 3 depicts a schematic illustration of one or more monitored parameters of a virtual machine of the system.

DETAILED DESCRIPTION

Figure 1:
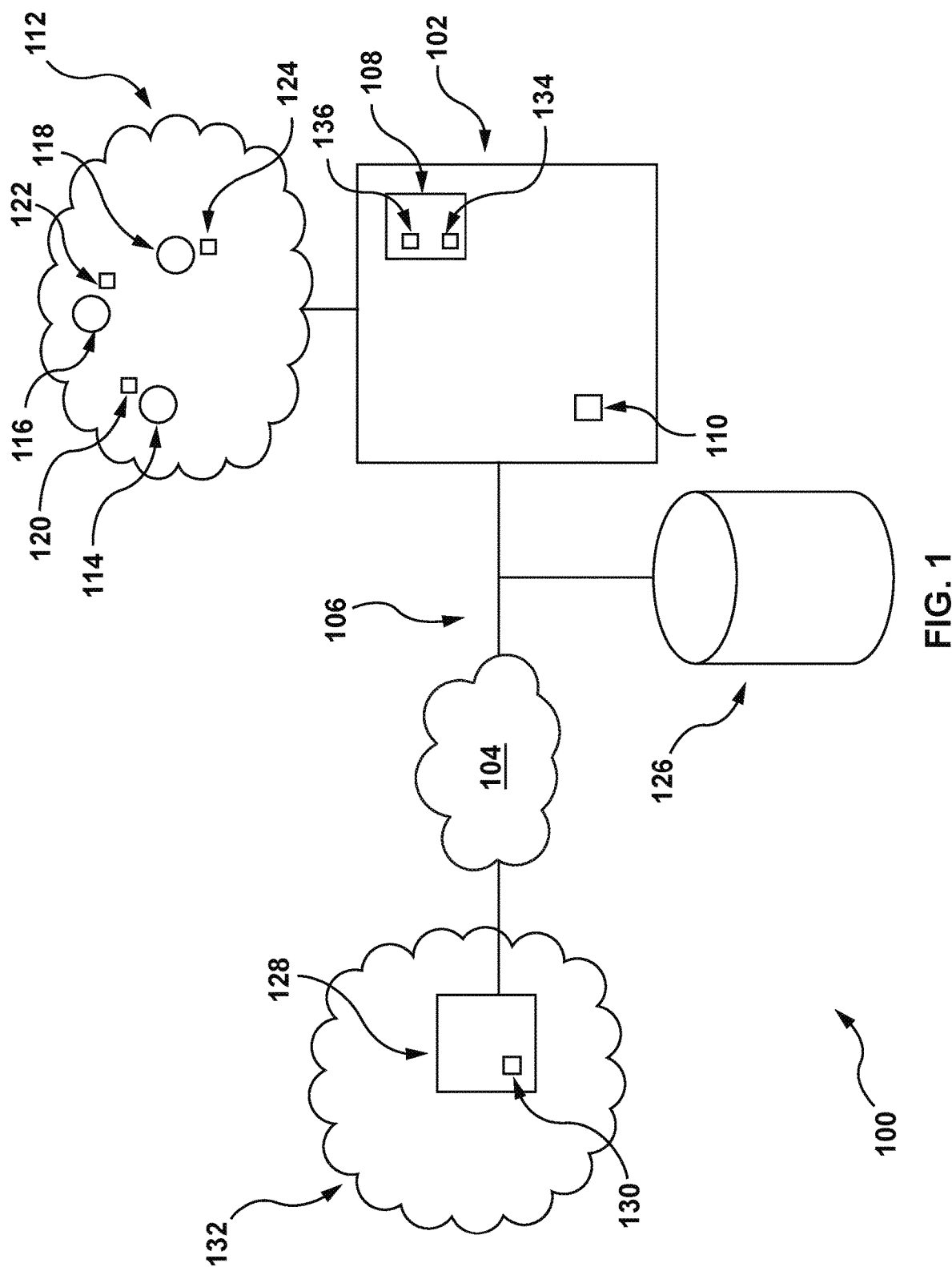
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102. The server 102 can be implemented as a conventional computer sever. In an example of an embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The implementation of the server 102 is well known. However, briefly speaking, the server 102 comprises a communication interface (not depicted) for two-way communication with a communication network 104 via a communication link 106. In some non-limiting embodiments of the present technology, the communication network 104 can be implemented as the Internet. In other embodiments of the present technology, the communication network 104 can be implemented differently, such as any wide-area communication network, local area communications network, a private communications network and the like.

How the communication link 106 is implemented is not particularly limited. For example, the communication link 106 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

The server 102 comprises a server memory 108 which comprises one or more non-transitory storage media and generally provides a place to store computer-executable program instructions executable by a server processor 110. By way of example, the server memory 108 may be implemented as tangible computer-readable storage medium including Read-Only Memory (ROM) and/or Random-Access Memory (RAM). The server memory 108 may also include one or more fixed storage devices in the form of, by way of example, hard disk drives (HDDs), solid-state drives (SSDs), and flash-memory cards.

The server 102 also hosts a cloud service 112, which provides users a dedicated space to store information in the form of files and folders (such as for example, the Yandex.Cloud™ service). In some non-limiting embodiments of the present technology, the cloud service 112 provides a user with the possibility of creating a virtual machine (VM) within the cloud service 112. In some other non-limiting embodiments of the present technology, the cloud service 112 may provide trial VMs for free to one or more users.

In the illustrated embodiment of the cloud service 112, there is provided 3 VMs, namely a first VM 114, a second VM 116 and a third VM 118. Generally speaking, when a VM is created, an ID is generated by the server 102. As such, the first VM 114 is associated with a first ID 120, the second VM is associated with a second ID 122, and the third VM is associated with a third ID 124. Needless to say, although only three VMs are illustrated within the cloud service 112, it is not limited as such, and it is contemplated that more or less than three VMs be present within the cloud service 112.

The server 102 is further coupled to a log database 126. In some non-limiting embodiments of the present technology, the log database 126 is configured to store a list of network resources accessed by each of the VMs included within the cloud service 112.

In other words, for each of the first VM 114, the second VM 116 and the third VM 118, the log database 126 stores a list of network resources that have been accessed. In some non-limiting embodiments of the present technology, an indication of all the network resources that have been accessed by the respective VM is stored. Needless to say, it is also contemplated that only an indication of a portion of the accessed network resources are stored (such as the 100 previously accessed network resources). The indication of the network resources can be stored in a form of a network address or the like.

Figure 2:
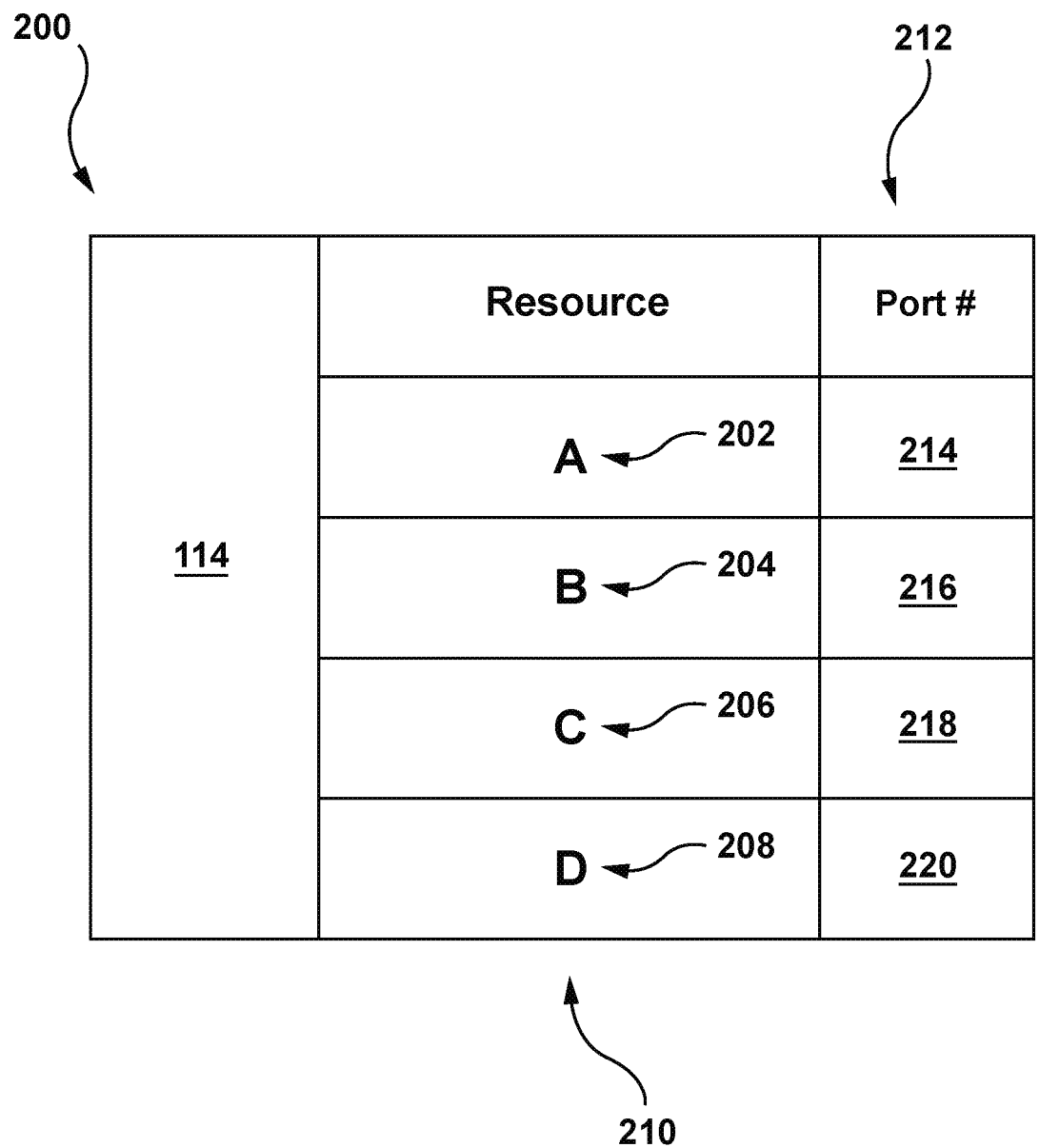
FIG. 2 depicts a schematic illustration of a list of network resources having been accessed by a virtual machine of the system.

Referring to FIG. 2, there is depicted a schematic illustration of a list 200 that comprises the network resources that have been accessed by the first VM 114.

In the illustration, the list 200 is indicative that the first VM 114 has accessed a set of network resources 210, which comprises 4 network resources, namely a first resource 202, a second resource 204, a third resource 206, and a fourth resource 208. For avoidance of doubt, although each of the first resource 202, the second resource 204, the third resource 206 and the fourth resource 208 is illustrated with a particular letter, it is merely done for the purpose of simplifying the illustration. Indeed, it should be understood that what is stored within the list 200 can correspond to the uniform resource locator (URL), or the IP address, of a respective one of the first resource 202, the second resource 204, the third resource 206, and the fourth resource 208 that have been accessed by the first VM 114.

In some non-limiting embodiments of the present technology, the list 200 further comprises a Transmission Control Protocol (TCP) or User Datagram Protocol (UDP) port number 212 used for accessing a respective one of the first resource 202, the second resource 204, the third resource 206 and the fourth resource 208. For example, a first port number 214 is associated with the first resource 202. In other words, the first VM 114 has accessed the first resource 202 using the first port number 214.

Similarly, the second resource 204 is associated with a second port number 216, the third resource 206 is associated with a third port number 218 and a fourth resource 208 is associated with a fourth port number 220.

Returning to FIG. 1, there is provided a cryptocurrency system 132 that is coupled to the communication network 104. How the cryptocurrency system 132 is implemented is generally known in the art and will not be described in detail here. Suffice it to say that the cryptocurrency system 132 may be associated with one of Bitcoin™ system, Litecoin™ system, Ethereum™ system, and Monero™ system and the like.

Within the cryptocurrency system 132, there is provided a pool server 128. How the pool server 128 is implemented is not limited, and may for example be implemented in a similar manner as the server 102. The pool server 128 is further coupled to, or has access to a block chain ledger 130 (also known simply as a "ledger").

Generally speaking, the cryptocurrency system 132 comprises miners (not shown). A main task of the miners is to continuously insert new data into the cryptocurrency system 132. More precisely, miners collect transaction data occurring within the cryptocurrency system 132, validate it, and insert it in a structure called a "block". The miners need to solve a mathematical computational task before the block is permanently inserted into the block chain ledger 130. When the block is merged with the block chain ledger 130, the miner gets a reward in a form of cryptocurrency. For example, if the cryptocurrency system 132 implements Bitcoins™ cryptocurrency, the worker will receive a certain number of Bitcoins. This process of validating transactions and receiving a cryptocurrency reward is referred as cryptocurrency mining (or simply "mining").

In some non-limiting embodiments of the present technology, the pool server 128 is configured to pool miners into a mining pool, such as the F2Pool, where the pool server 128 parallelizes the mining work amongst multiple miners.

In some non-limiting embodiments of the present technology, a communication protocol used within the cryptocurrency system 132 is the STRATUM overlay protocol. Generally speaking, the STRATUM overlay protocol is a clear text communication protocol between the pool server 128 and the miners that is built over TCP/IP and uses the JSON-RPC format.

Although only a single instance of the pool server 128 is illustrated within the cryptocurrency system 132, it is done so for ease of understanding and it should be understood that the cryptocurrency system 132 is made of a plurality of electronic devices and pool servers.

The server 102 is configured to execute a monitoring application 134. In some non-limiting embodiments of the present technology, the monitoring application is configured to determine, for each of the VMs of the cloud service 112, one or more usage parameters attributable to such VM. More precisely, the monitoring application 134 is configured to monitor the usage of the server processor 110, and the server memory 108 usage for writing and reading for each of the first VM 114, second VM 116 and third VM 118.

With reference to FIG. 3, there is depicted a schematic illustration of a table of the one or more usage parameters associated with the first VM 114 that is monitored by the monitoring application 134. The table can be implemented as a monitoring log 300.

The monitoring log 300 illustrates a CPU usage 302, a memory reading usage 304, and a memory writing usage 306 of the first VM 114 at different time period.

The CPU usage 302 is indicative of a percentage of a processor assigned to the first VM 114 being used. For example, it is contemplated that a predetermined amount of the server processor 110 power is assigned to the first VM 114. As such the CPU usage 302 is indicative of a portion of the assigned processing power that is being used at a given moment in time.

The memory reading usage 304 is indicative of a percentage of a storage, such as the server memory 108 implemented as HDD or SDD, assigned to the first VM 114 being used for reading. For example, it is contemplated that a predetermined amount of the server memory 108 is assigned to the first VM 114 for reading. As such, the memory reading usage 304 is indicative of a portion of the assigned memory being used for reading at the given moment in time.

The memory writing usage 306 is indicative of a percentage of the storage, such as the server memory 108, assigned to the first VM 114 is being used for writing. For example, it is contemplated that a predetermined amount of the server memory 108 is assigned to the first VM 114 for writing. As such, the memory reading usage 304 is indicative of a portion of the assigned memory being used for writing at the given moment in time.

Returning to FIG. 1, the server 102 is configured to execute an authentication application 136. In some non-limiting embodiments of the present technology, the authentication application 136 is configured to determine if a VM within the cloud service 112 is engaging in a malicious activity, such as mining.

Although the description of the system 100 makes reference to various hardware entities (such as the server 102, the log database 126, and the pool server 128) depicted separately, it should be understood that this is done for ease of understanding. It is contemplated that the various functions executed by these various entities be executed by a single entity or be distributed amongst different entities.

Authentication Application 136

Figure 4:
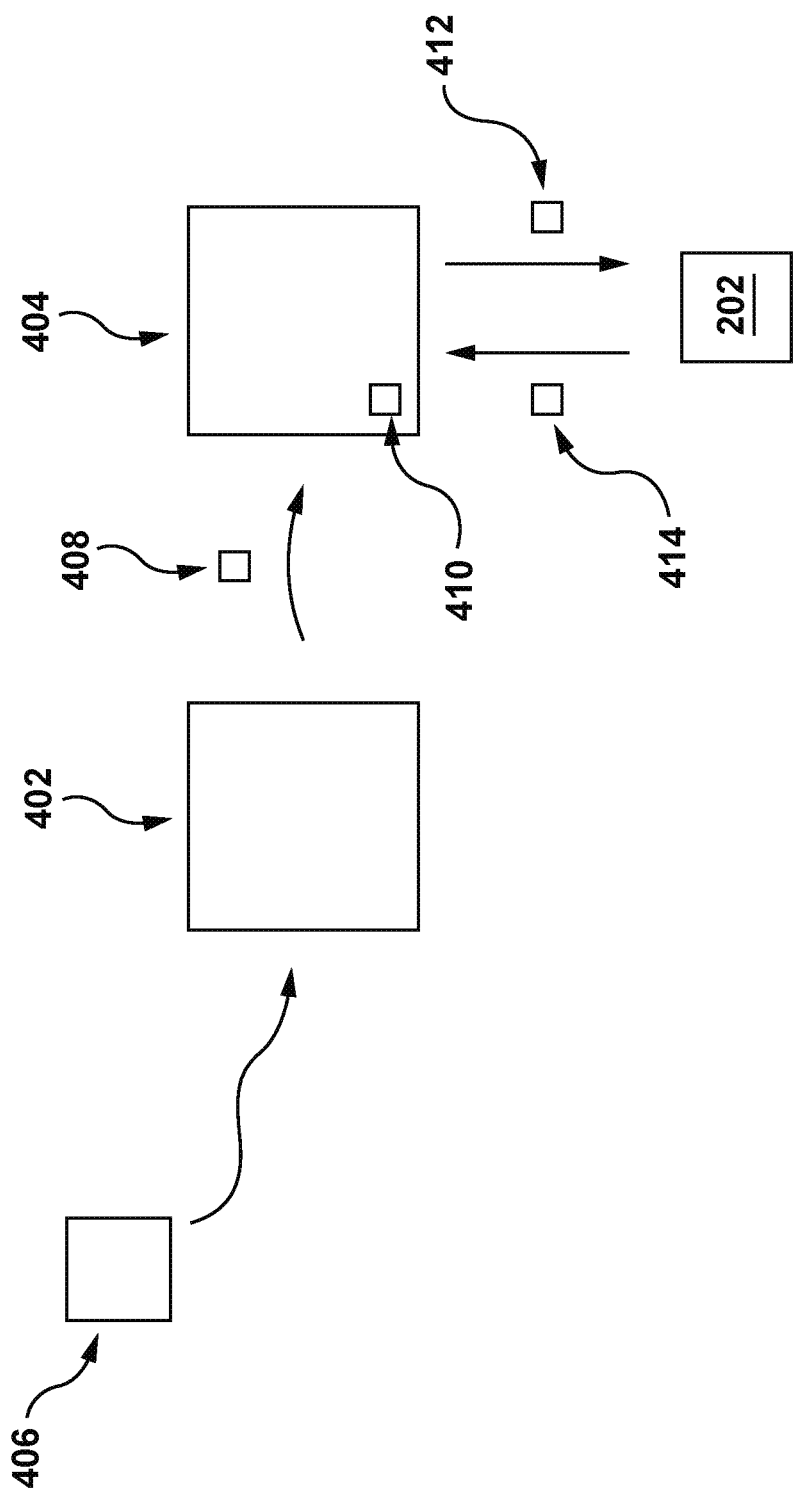
FIG. 4 depicts an example of a process of detecting malicious activity of a predetermined type.

With reference to FIG. 4, there is depicted a schematic diagram of a process for detecting malicious activity. The process for detecting the malicious activity is executed by the authentication application 136 (see FIG. 1) implemented in accordance with a non-limiting embodiment of the present technology. The authentication application 136 executes (or otherwise has access to): a receiving routine 402, and a determination routine 404.

In the context of the present specification, the term "routine" refers to a subset of the computer executable program instructions of the authentication application 136 that is executable by the server processor 110 (the receiving routine 402, the determination routine 404). For the avoidance of any doubt, it should be expressly understood that the receiving routine 402, the determination routine 404 are illustrated herein as separate entities for ease of explanation of the process executed by the authentication application 136. It is contemplated that some or all of the receiving routine 402, the determination routine 404 may be implemented as one or more combined routines.

For ease of understanding the present technology, functionality of each of the receiving routine 402, the determination routine 404, as well as data and/or stored therein are described below.

Receiving Routine 402

The receiving routine 402 is configured to receive a data packet 406 from the monitoring application 134 (see FIG. 1). The data packet 408 comprises an indication of the one or more usage parameters associated with the first VM 114 (see FIG. 3), the second VM 116 and the third VM 118.

In response to receiving the data packet 406, the receiving routine 402 is configured to execute the following functions.

First, the receiving routine 402 is configured to analyze the one or more usage parameters associated with each of the first VM 114, the second VM 116 and the third VM 118, and select one or more suspicious VM based on the analysis of the one or more usage parameters.

How the one or more suspicious VMs are determined is not limited. In some non-limiting embodiments of the present technology, the receiving routine 402 is configured to apply one or more heuristic rules to the one or more usage parameters of the first VM 114, the second VM 116 and the third VM 118.

In some non-limiting embodiments of the present technology, the one or more heuristic rules may be determined based on an analysis of actual VM executing mining activities within the cloud service 112.

Just as a non-limiting example, the set of heuristic rules may include one or more of the following determinations:

An average CPU usage 302 (see FIG. 3) being above a first pre-determined threshold (such as 90%, 95% and the like);

A coefficient of variation of the CPU usage 302 being below a second pre-determined threshold (such as 5%, 10% and the like);

The memory reading usage 304 being above a third pre-determined threshold; for example, compared to the 0.75 percentile of users of the VMs; and The memory writing usage 306 being below a fourth pre-determined threshold; for example, compared to the 0.75 percentile of users of the VMs.

In some non-limiting embodiments of the present technology, the set of heuristic rules may be applied using a sliding window. For example, taking the first VM 114 as an example, the set of heuristic rules is applied for a predetermined periods of time where the first VM 114 is accessing each of the first resource 202, the second resource 204, the third resource 206 and the fourth resource 208. The sliding window can be a few hours, a few days, or any other suitable length.

Let us assume, for the purpose of explanation that, within the cloud service 112, the first VM 114 and the second VM 116 have been determined to be suspicious. In other words, at least some of the one or more usage parameters associated with the first VM 114 and the second VM 116 closely resembles the usage parameters of a VM engaged in a malicious activity such as mining. As such, it is contemplated that the receiving routine 402 may have access to a set of reference parameters comprising a reference average CPU usage, a reference coefficient of variation of the CPU usage, a reference memory reading usage, and a reference memory writing usage and is configured to determine if each of the average CPU usage 302, the coefficient of variation of the CPU usage 302, the memory reading usage 304 and the memory writing usage 306 is within a predetermined range of the respective reference parameters at a given time or within a given time range.

In some non-limiting embodiments of the present technology, if a single one of the one or more usage parameter is within the predetermined range, the associated VM is considered to be suspicious. Needless to say, it is also contemplated that the suspiciousness of the VM may be based on more than one of the one or more usage parameter being within the predetermined ranges.

Determination Routine 404

The receiving routine 402 is then configured to transmit a data packet 408 to the determination routine 404. The data packet 408 comprises the first ID 120 and the second ID 122, which are associated with the first VM 114 and the second VM 116, respectively.

Now, it should be understood that the simple fact for a given VM meets some or all of the above heuristic rules does not per se mean that the given VM is engaged in the malicious activity (such as mining or the like). Indeed, it is possible for the given VM to be executing other computationally expensive or memory intensive computer-executable tasks, such as video decoding, voice to text decoding, or the like.

Accordingly, the determination routine 404 is configured to verify if the suspicious VM is engaged in a malicious activity such as mining.

To determine if one of the first VM 114 or the second VM 116 is engaged in a malicious activity such as mining, the determination routine 404 is configured to execute the following functions.

Firstly, the determination routine 404 is configured to retrieve, based on the first ID 120 and the second ID 122, from the log database 126, the list of the network resources that have been accessed by the first VM 114 (i.e. the list 200) and the second VM 116 (not shown).

Having retrieved the lists, the determination routine 404 is configured to apply one or more heuristic rules to determine one or more suspicious web resource contained within the lists. More precisely, taking the first VM 114 as an example, the determination routine 404 is configured to determine if the one or more web resources within the list 200 is associated with a malicious activity.

Recalling that the list 200 includes the port number 212 associated with each network resources that have been accessed by the first VM 114, the one or more heuristic rules may include one or more of the following determinations:

A network resource has been accessed using one of a TCP port 3333, TCP port 5555, TCP port 7777, TCP port 8080, TCP port 14433, TCP port 14444, TCP port 37781, TCP port 45700, TCP port 45560 and TCP port 6667.

The above identified ports have been determined based on the appreciation of the developers that many, if not most, of the communications in the cryptocurrency system 132 are executed using the above mentioned ports.

As such, in some non-limiting embodiments of the present technology, the determination routine 404 is configured to analyze the one or more port numbers 212 that have been accessed by the first VM 114 and the second VM 116 to determine if any resource is associated with one of the above identified port numbers.

Let us assume for example, within the list 200 and the list (not shown) associated with the second VM 116, only the first port number 214 corresponds to one of the numbers (TCP port 3333, TCP port 5555, TCP port 7777, TCP port 8080, TCP port 14433, TCP port 14444, TCP port 37781, TCP port 45700, TCP port 45560 and TCP port 6667). In other words, the determination routine 404 has determined that the first resource 202 is associated with a port number that is known to be associated with mining activities (TCP port 3333, TCP port 5555, TCP port 7777, TCP port 8080, TCP port 14433, TCP port 14444, TCP port 37781, TCP port 45700, TCP port 45560 and TCP port 6667).

In some alternative non-limiting embodiments of the present technology, the authentication application 136 may have access to a black list comprising known network resources associated with the malicious activity. For example, the black list may include the URL or the IP address of mining pools. As such, instead of using the port numbers, the determination routine 404 may be configured to identify the network resources accessed by the first VM 114 and the second VM 116 that is also present within the black list.

In some alternative non-limiting embodiments of the present technology, if a given VM has accessed a given network resource using the port number that is known to be associated with mining activities (TCP port 3333, TCP port 5555, TCP port 7777, TCP port 8080, TCP port 14433, TCP port 14444, TCP port 37781, TCP port 45700, TCP port 45560 and TCP port 6667), and the given network resource is within black list, the determination routine 404 is configured to consider the given network resource as a suspicious network resource.

In some non-limiting embodiments of the present technology, the determination routine 404 is configured to execute a polling robot 410. The polling robot 410 can be implemented as a software capable of transmitting a specific message that is associated with a malicious activity. For example, the polling robot 410 is configured to transmit a ping message 412 to the first resource 202, using a specific message that is associated with mining activities.

Needless to say, it is also contemplated that instead of transmitting the ping message 412 to the first resource 202 (determined to be associated with one of the above identified port numbers), the determination routine 404 may be configured to transmit the ping message 412 to each of the network resources accessed by the first VM 114 and the second VM 116.

In some non-limiting embodiments of the present technology, the ping message 412 comprises a first pre-determined format.

In some non-limiting embodiments of the present technology, the first pre-determined format is in a format based on the STRATUM overlay protocol.

In some non-limiting embodiments of the present technology, the first predetermined format may correspond to a synchronize message in the STRATUM overlay protocol that is transmitted as part of a TCP handshake.

In some non-limiting embodiments of the present technology, the first predetermined format may correspond to a miner subscription message, or a connection subscription message, transmitted in the STRATUM overlay protocol format. Just as an illustration, the ping message 412 may be implemented as "mining.subscribe, params," that describes the, albeit fake, mining capabilities of the polling robot 410.

Now, in response to receiving the ping message 412, the first resource 202 responds with a response message 414. The determination routine 404 is then configured to determine if the response message 414 corresponds to a message of a second predetermined format.

For example, where the ping message 412 corresponds to the synchronize message, the second predetermined format of the response message 414 corresponds to a synchronize-acknowledge message transmitted in a format based on the STRATUM overlay protocol.

In another example, if the ping message 412 corresponds to the miner subscription message, the second predetermined format of the response message 414 corresponds to a subscription response message in a format based on the STRATUM overlay protocol.

In response to determining that the response message 414 is in the second predetermined format, the determination routine 404 determines that the first resource 202 corresponds to a resource within a cryptocurrency system (such as the cryptocurrency system 132). In other words, the determination routine 404 is configured to determine that the first VM 114 is engaging in mining activities by communicating with the first resource 202. For example, the first resource 202 corresponds to a resource associated with a mining pool controlled by the pool server 128 (see FIG. 1).

On the other hand, if it is determined that the response message is not in the second predetermined format, the first resource 202 is determined not to be associated with the malicious activity.

In some non-limiting embodiments of the present technology, in response to determining that the first VM 114 is engaging in mining activities within the cloud service 112, the determination routine 404 may be configured to execute a remedial action.

In some non-limiting embodiments of the present technology, the remedial action may correspond to one of: blocking all traffic from the cloud service 112 to the first resource 202, blocking all traffic from the first VM 114, and shutting down the first VM 114.

Although in the above explanation of the present technology has been made in reference to the cloud service 112, it is not limited as such. It is contemplated that the present technology may be used within other environments. Just as an illustration, it is contemplated that the first VM 114, the second VM 116, and the third VM 118 be physical electronic devices inter-connected within a Local Area Network (LAN) that is coupled to the communication network 104. In such situation, it is contemplated that a supervisory device (not shown) also connected to the LAN is configured to perform the functions of the monitoring application 134 and the authentication application 136.

Figure 5:
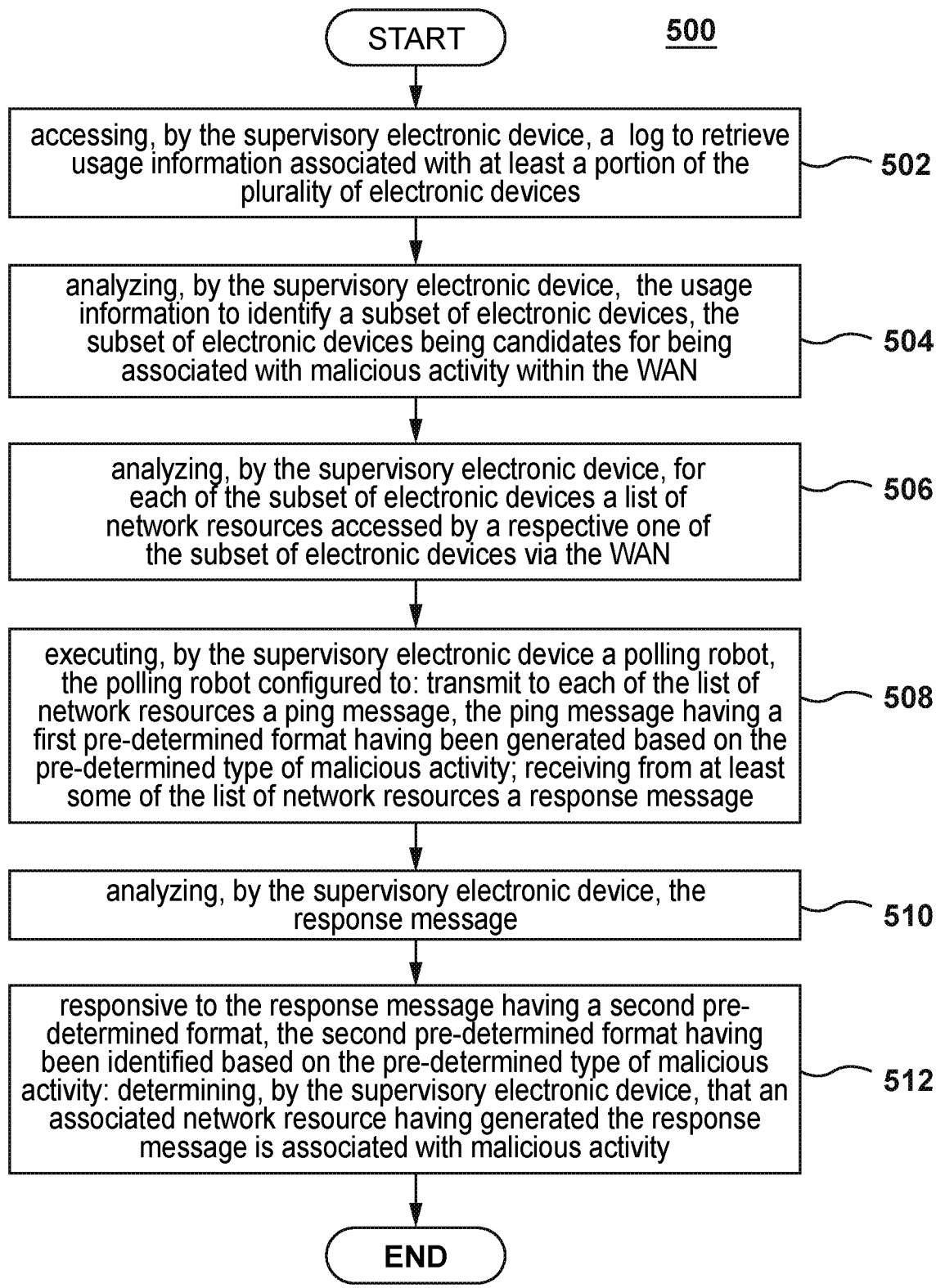
FIG. 5 depicts a flow chart of a method for detecting malicious activity of a predetermined type.

Given the architecture and examples provided hereinabove, it is possible to execute a computer-implemented method of determining a malicious activity of a predetermined type. With reference to FIG. 5, there is depicted a flow chart of a method 500, the method 500 being executable in accordance with non-limiting embodiments of the present technology. The method 500 can be executed by the server 102.

Step 502: accessing, by the supervisory electronic device, a log to retrieve usage information associated with at least a portion of the plurality of electronic devices The method 500 starts with step 502.

At step 502, the authentication application 136 is configured to access the monitoring logs of the first VM 114, the second VM 116 and the third VM 118.

In some non-limiting embodiments of the present technology, the monitoring logs may be received via the data packet 408 from the monitoring application.

Taking the monitoring log 300 as an example, the monitoring log 300 comprises information regarding the CPU usage 302, the memory reading usage 304, and the memory writing usage 306 of the first VM 114 at different time periods.

Step 504: analyzing, by the supervisory electronic device, the usage information to identify a subset of electronic devices, the subset of electronic devices being candidates for being associated with malicious activity within the WAN At step 504, the authentication application 136 is configured to analyze the one or more usage parameters associated with each of the first VM 114, the second VM 116, and the third VM 118 and select one or more suspicious VM based on the analysis of the one or more usage parameters.

How the one or more suspicious VMs are determined is not limited. In some non-limiting embodiments of the present technology, the receiving routine 402 is configured to apply one or more rules to the one or more usage parameters of the first VM 114, the second VM 116 and the third VM 118.

Step 506: analyzing, by the supervisory electronic device, for each of the subset of electronic devices a list of network resources accessed by a respective one of the subset of electronic devices via the WAN At step 506, the authentication application 136 is configured to retrieve from the log database 126, a list of network resources that have been accessed by the one or more suspicious VMs.

For example, let us assume that the first VM 114 and the second VM 116 were determined to be suspicious.

Accordingly, the authentication application 136 is configured to retrieve, from the log database 126, the list of network resources accessed by the first VM 114 and the second VM 116.

Step 508: executing, by the supervisory electronic device a polling robot, the polling robot configured to: transmit to each of the list of network resources a ping message, the ping message having a first pre-determined format having been generated based on the pre-determined type of malicious activity; receiving from at least some of the list of network resources a response message At step 508, the authentication application 136 is configured to execute the polling robot 410.

The polling robot 410 is configured to transmit the ping message 412 to the network resources included within the lists.

In some non-limiting embodiments of the present technology, the ping message 412 is transmitted with the STRATUM overlay protocol.

Step 510: analyzing, by the supervisory electronic device, the response message At step 510, the authentication application 136 is configured to receive and analyze the response message 414.

Step 512: responsive to the response message having a second pre-determined format, the second pre-determined format having been identified based on the pre-determined type of malicious activity: determining, by the supervisory electronic device, that an associated network resource having generated the response message is associated with malicious activity.

At step 512, the authentication application 136 is configured to determine if the response message 414 is in the second pre-determined format.

In response to the response message 414 being in the second pre-determined format, the authentication application 136 is configured to determine that the associated network resource is associated with mining activities, and as such configured to determine that the VM accessing the network resource is engaging in mining activities.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for identifying malicious activity of a pre-determined type, the method being executable by a supervisory electronic device, the supervisory electronic device being part of a local area network (LAN), the LAN including a plurality of electronic devices configured to access network resources via the LAN and a wide area network (WAN) accessible by the LAN, the method comprising:
   accessing, by the supervisory electronic device, a log to retrieve usage information associated with at least a portion of the plurality of electronic devices;
   analyzing, by the supervisory electronic device, the usage information to identify a subset of electronic devices, the subset of electronic devices being candidates for being associated with malicious activity within the WAN;
   analyzing, by the supervisory electronic device, for each of the subset of electronic devices a list of network resources accessed by a respective one of the subset of electronic devices via the WAN;
   executing, by the supervisory electronic device a polling robot, the polling robot configured to:
       transmit to each of the list of network resources a ping message, the ping message having a first pre-determined format having been generated based on the pre-determined type of malicious activity;
       receive from at least some of the list of network resources a response message;
   analyzing, by the supervisory electronic device, the response message;
   responsive to the response message having a second pre-determined format, the second pre-determined format having been identified based on the pre-determined type of malicious activity:
       determining, by the supervisory electronic device, that an associated network resource having generated the response message is associated with malicious activity.

2. The method of claim 1, wherein in response to one of: (i) the response message not having the second pre-determined format and (ii) lack of response from a given one of the list of network resources, determining that the given one of the list of network resources is not associated with malicious activity.

3. The method of claim 1, wherein the pre-determined type is blockchain mining.

4. The method of claim 3, wherein the first pre-determined format and the second pre-determined format are part of STRATUM overlay protocol.

5. The method of claim 4, wherein the first pre-determined format and the second pre-determined format are part of handshake messages of the STRATUM overlay protocol.

6. The method of claim 1, wherein the usage information is associated with operation of the portion of the plurality of electronic devices.

7. The method of claim 6, wherein the usage information comprises at least one of:
   CPU usage;
   disk usage for writing; and
   disk usage for reading.

8. The method of claim 6, wherein the analyzing the usage information comprises applying at least one heuristic to the usage information.

9. The method of claim 8, wherein the at least one heuristic comprises:
   determining an average CPU usage to be above a first threshold;
   determining a coefficient of variation of the CPU usage to be below a second threshold;
   determining the disk usage for reading to be above a third threshold; and
   determining the disk usage for writing to be below a fourth threshold.

10. The method of claim 1, wherein the usage information comprises a list of network addresses used by the portion of the plurality of electronic devices to access network resources via the WAN.

11. The method of claim 10, wherein the analyzing the usage information comprises applying at least one heuristic to the usage information.

12. The method of claim 11, wherein the at least one heuristic comprises determining if access to the network resource has been using a pre-determined port associated with the pre-determined type of malicious activity.

13. The method of claim 11, wherein the at least one heuristic comprises:
   determining if access to the network resource has been done using one of a TCP port 3333, TCP port 5555, TCP port 7777, TCP port 8080, TCP port 14433, TCP port 14444, TCP port 37781, TCP port 45700, TCP port 45560 and TCP port 6667.

14. The method of claim 1, wherein LAN comprises a cloud-based computing environment, and wherein the plurality of electronic devices comprises a plurality of Virtual Machines (VM) executed in the cloud-based computing environment.

15. The method of claim 1, wherein the plurality of computing devices comprises a plurality of physical electronic devices connectable to the LAN for accessing the WAN.

16. The method of claim 1, further comprising executing a remedial action in association with the associated network resource that has been determined to be associated with malicious activity.

17. The method of claim 16, wherein the remedial action comprises blocking traffic to the associated network resources from the LAN.

18. The method of claim 16, wherein the remedial action comprises blocking all network access to the WAN for a given electronic device that has accessed the network resource.

19. A supervisory electronic device for identifying malicious activity of a pre-determined type, the supervisory electronic device being part of a local area network (LAN), the LAN including a plurality of electronic devices configured to access network resources via the LAN and a wide area network (WAN) accessible by the LAN, the supervisory electronic device comprising a processor being configured to:

access a log to retrieve usage information associated with at least a portion of the plurality of electronic devices;

analyze the usage information to identify a subset of electronic devices, the subset of electronic devices being candidates for being associated with malicious activity within the WAN;

analyze for each of the subset of electronic devices a list of network resources accessed by a respective one of the subset of electronic devices via the WAN;

execute a polling robot, the polling robot configured to:

transmit to each of the list of network resources a ping message, the ping message having a first pre-determined format having been generated based on the pre-determined type of malicious activity;

receive from at least some of the list of network resources a response message;

analyze the response message;

responsive to the response message having a second pre-determined format, the second pre-determined format having been identified based on the pre-determined type of malicious activity:

determine that an associated network resource having generated the response message is associated with malicious activity.

20. The device of claim 19, wherein in response to one of: (i) the response message not having the second pre-determined format and (ii) lack of response from a given one of the list of network resources, the processor is configured to determine that the given one of the list of network resources is not associated with malicious activity.

\* \* \* \* \*